(12) United States Patent
Dean et al.

(10) Patent No.: US 8,370,044 B2
(45) Date of Patent: Feb. 5, 2013

(54) NOX COMPLIANT PEAK FOR GAS TURBINE

(75) Inventors: Douglas Edward Dean, Greer, SC (US); Derrick Walter Simons, Greer, SC (US); Abhijit Prabhakar Kulkarni, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 694 days.

(21) Appl. No.: 12/492,772

(22) Filed: Jun. 26, 2009

(65) Prior Publication Data

US 2010/0332103 A1 Dec. 30, 2010

(51) Int. Cl.
*F02C 9/00* (2006.01)
*F02C 7/08* (2006.01)

(52) U.S. Cl. ........ 701/100; 60/39.24; 60/39.27; 60/39.5

(58) Field of Classification Search .................. 701/100; 60/39.24, 39.5, 772, 773, 775
See application file for complete search history.

(56) References Cited

U.S. PATENT DOCUMENTS

| | | | |
|---|---|---|---|
| 3,842,597 A | 10/1974 | Ehrich | |
| 4,928,481 A | 5/1990 | Joshi et al. | |
| 5,216,876 A * | 6/1993 | Gabrielson et al. | 60/772 |
| 5,584,172 A * | 12/1996 | Oguchi et al. | 60/39.5 |
| 5,706,643 A | 1/1998 | Snyder et al. | |
| 5,857,321 A * | 1/1999 | Rajamani et al. | 60/39.27 |
| 6,715,916 B2 * | 4/2004 | Tomlinson et al. | 374/144 |
| 6,721,631 B2 * | 4/2004 | Shimizu et al. | 700/287 |
| 6,805,483 B2 * | 10/2004 | Tomlinson et al. | 374/144 |
| 6,912,856 B2 * | 7/2005 | Morgan et al. | 60/773 |
| 7,100,357 B2 * | 9/2006 | Morgan et al. | 60/39.281 |
| 7,185,494 B2 * | 3/2007 | Ziminsky et al. | 60/746 |
| 7,210,297 B2 * | 5/2007 | Shah et al | 60/772 |
| 7,246,002 B2 * | 7/2007 | Healy et al. | 701/100 |
| 7,269,953 B2 * | 9/2007 | Gadde et al. | 60/773 |
| 7,441,398 B2 * | 10/2008 | Ziminsky et al. | 60/39.281 |
| 7,513,100 B2 * | 4/2009 | Motter et al. | 60/39.3 |
| 7,593,803 B2 * | 9/2009 | Healy et al. | 701/100 |
| 7,776,280 B2 * | 8/2010 | Telford | 422/172 |
| 7,882,789 B2 * | 2/2011 | Kumar et al. | 105/27 |
| 7,891,192 B2 * | 2/2011 | Myers et al. | 60/741 |
| 2002/0020396 A1 * | 2/2002 | Sakamoto | 123/492 |
| 2005/0114010 A1 * | 5/2005 | Healy et al. | 701/100 |
| 2006/0266255 A1 * | 11/2006 | Donnelly et al. | 105/61 |
| 2007/0089425 A1 * | 4/2007 | Motter et al. | 60/775 |
| 2007/0214766 A1 * | 9/2007 | Obana et al. | 60/39.15 |
| 2008/0295521 A1 * | 12/2008 | Simons et al. | 60/805 |
| 2009/0063003 A1 * | 3/2009 | Meadows et al. | 701/100 |
| 2009/0229238 A1 * | 9/2009 | Zhang et al. | 60/39.24 |
| 2010/0332103 A1 * | 12/2010 | Dean et al. | 701/100 |
| 2011/0037276 A1 * | 2/2011 | Hoffmann et al. | 290/40 |

* cited by examiner

*Primary Examiner* — Thomas Black
*Assistant Examiner* — Wae Louie
(74) *Attorney, Agent, or Firm* — Cantor Colburn LLP

(57) ABSTRACT

A gas turbine comprises a plurality of target exhaust temperature determination modules, the plurality of target exhaust temperature modules comprising a nitrogen oxide (NOx) compliance module configured to determine an exhaust temperature at which an exhaust of the gas turbine complies with a maximum permitted level of NOx; at least one bias module, the at least one bias module configured to apply a bias to an output of at least one of the plurality of target exhaust temperature determination modules; and a controller configured to operate the gas turbine to produce the exhaust temperature determined by the NOx compliance module.

19 Claims, 4 Drawing Sheets

NOX COMPLIANT PEAK FOR GAS TURBINE

BACKGROUND OF THE INVENTION

The subject matter disclosed herein relates to a controller for a gas turbine.

Industrial and power generation gas turbines may have a control system, also referred to as a controller, that monitors and controls turbine operation. These controllers govern the combustion system of the gas turbine based on information and data sensors located at various positions in and around the gas turbine. Control scheduling algorithms are executed by the controller to operate the combustion system of the gas turbine based on the sensor data. Combustion systems for gas turbines are generally sensitive to ambient conditions, such as outside ambient humidity or temperature. In particular, seasonal variations in humidity or temperature may affect the operation of the combustion system.

The gas turbine may create environmental pollutants such as nitrogen oxides (NOx) during operation, which may be emitted as part of the turbine exhaust. Levels of NOx emissions by the gas turbine may be affected by ambient conditions. For example, a high ambient inlet temperature may drive NOx emissions relatively low; high ambient humidity may also lower NOx emissions. Periods of high ambient temperature or high ambient humidity may coincide with periods of high power demand, during which the combustion system of the gas turbine may be operated at a peak firing temperature to meet the high power demand. However, NOx emissions levels may increase as the firing temperature of the combustion system increases. Emissions of NOx from the gas turbine must be maintained below mandated levels in order to comply with emissions regulations.

BRIEF DESCRIPTION OF THE INVENTION

According to one aspect of the invention, a gas turbine comprises a plurality of target exhaust temperature determination modules, the plurality of target exhaust temperature modules comprising a nitrogen oxide (NOx) compliance module configured to determine an exhaust temperature at which an exhaust of the gas turbine complies with a maximum permitted level of NOx; at least one bias module, the at least one bias module configured to apply a bias to an output of at least one of the plurality of target exhaust temperature determination modules; and a controller configured to operate the gas turbine to produce the exhaust temperature determined by the NOx compliance module.

According to another aspect of the invention, a method for controlling a gas turbine comprises determining whether conditions are appropriate for peak operation, and in the event that conditions are determined to be appropriate for peak operation: determining a first peak exhaust temperature for the gas turbine at which nitrogen oxide (NOx) emissions of the gas turbine are below a maximum permitted level; applying a bias to a second determined exhaust temperature; and operating the gas turbine at the first determined peak exhaust temperature.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of systems and methods for NOx compliant peak for a gas turbine are provided. When ambient temperature, humidity, and power demand conditions are determined to be appropriate, gas turbine combustors may be operated at a peak firing temperature, up to a limit of NOx emissions compliance, resulting in high energy production to meet high demand levels.

Figure 1:
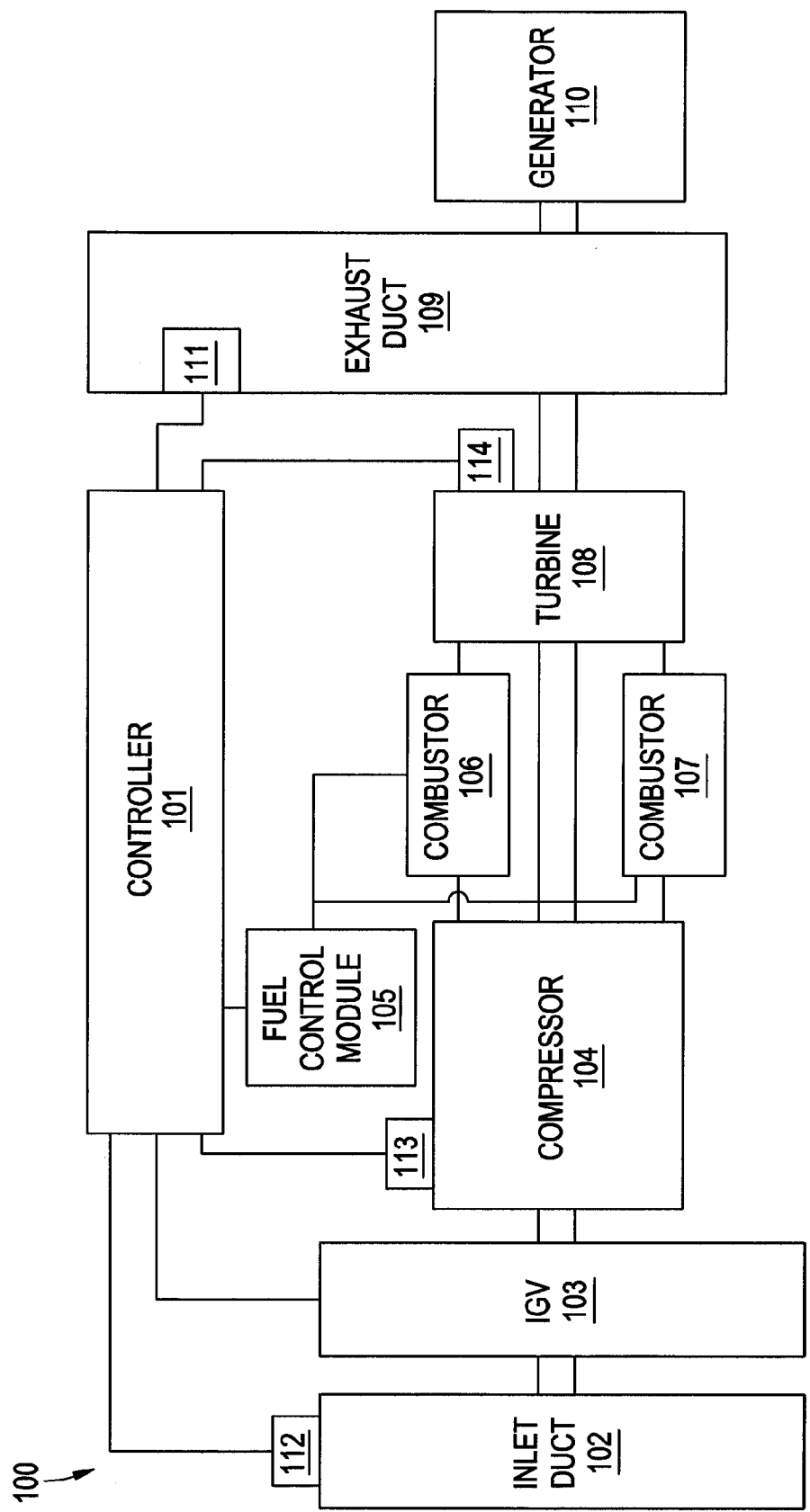
FIG. 1 is an embodiment of a gas turbine having a controller.

FIG. 1 illustrates an embodiment of a gas turbine 100. Gas turbine 100 comprises a compressor 104, combustors 106 and 107, a turbine 108 drivingly coupled to the compressor 104, and a controller 101. Two combustors 106 and 107 are shown in gas turbine 100 for illustrative purposes only; embodiments of a gas turbine 100 may comprise any appropriate number of combustors. Inlet duct 102 feeds ambient air and possibly injected water via inlet guide vanes 103 to the compressor 104. The inlet duct 102 may have ducts, filters, screens, and sound absorbing devices that each may contribute to a pressure loss of ambient air flowing through the inlet 102 into the inlet guide vanes 103 of the compressor 104. Exhaust duct 109 directs combustion gases from the outlet of the turbine 108 through ducts having, for example, emission control and sound absorbing devices. The exhaust duct 109 applies a back pressure to the turbine. The amount of back pressure may vary over time due to the addition of components to the exhaust duct 109, and to dust and dirt clogging exhaust passages. The turbine 108 may drive a generator 110 that produces electrical power. The inlet loss to the compressor 104 and the turbine 108 exhaust pressure loss tend to be a function of corrected flow through the gas turbine 100. Accordingly, the amount of inlet loss and turbine back pressure vary with the flow through the gas turbine 100.

The operation of the gas turbine may be monitored by sensors 111-114. Sensors 111-114 detect conditions at the inlet duct 102, exhaust duct 109, turbine 108, compressor 104, and ambient conditions surrounding gas turbine 100. For example, temperature sensors may monitor ambient temperature surrounding the gas turbine, compressor discharge temperature, turbine exhaust gas temperature, and other temperature measurements of the gas stream through the gas turbine. Pressure sensors may monitor ambient pressure, and static and dynamic pressure levels at the compressor inlet and outlet and turbine exhaust, as well as at other locations in the gas stream. Further, humidity sensors, e.g., wet and dry bulb thermometers, may measure ambient humidity in the inlet duct of the compressor. The sensors 111-114 may also comprise flow sensors, speed sensors, flame detector sensors, valve position sensors, guide vane angle sensors, or the like that sense various data pertinent to the operation of gas turbine 100. Sensors 111-114 are shown for exemplary purposes only; any appropriate number or type of sensors may be placed at any appropriate location on gas turbine 100.

Embodiments of controller 101 may regulate the operation of combustors 106 and 107 via fuel control module 105 using the information provided by sensors 111-114 to produce exhaust having a target temperature at exhaust duct 109. The target exhaust temperature is determined based on considerations including but not limited to emissions levels of carbon monoxide (CO) and NOx, and temperature tolerances of the physical components of gas turbine 100. Controller 101 may be embodied in any appropriate hardware or software. Fuel control module 105 regulates the rate of fuel flowing from a fuel supply (not shown) to the combustors 106 and 107, thereby determining the combustion temperature and levels of emissions of combustors 106 and 107. The fuel control module may in some embodiments be a separate unit 105, or may in other embodiments be an internal component of controller 101.

Figure 2:
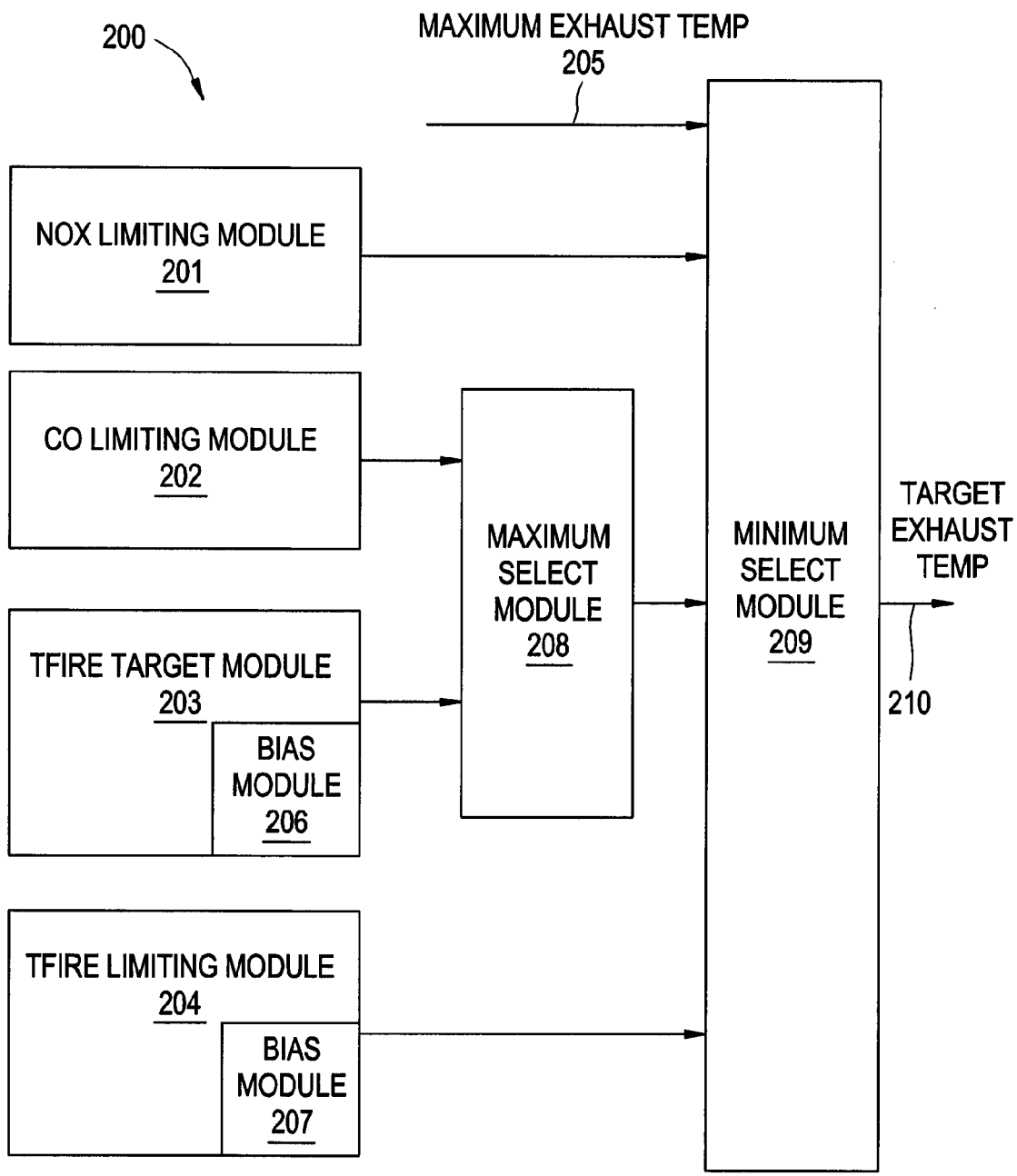
FIG. 2 is an embodiment of a gas turbine controller comprising NOx compliant peak.

FIG. 2 illustrates an embodiment of a gas turbine controller 200 comprising NOx compliant peak. Modules 201-204 may use any relevant data from sensors 111-114, including but not limited to ambient humidity, ambient pressure, compressor pressure ratio, specific humidity, inlet pressure loss, exhaust backpressure, or compressor exit temperature, to determine a maximum temperature based on considerations including but not limited to emissions levels of CO or NOx, or temperature tolerances of the physical components of the gas turbine 100. A maximum rated exhaust temperature for the gas turbine 100 is supplied to minimum selector module 209 at input 205. NOx limiting module 201 determines a maximum exhaust temperature at which emissions levels of NOx are compliant with regulatory levels, and supplies the determined NOx compliant temperature to minimum selector module 209. CO limiting module 202 determines a maximum exhaust temperature at which emissions levels of CO are compliant with regulatory levels. TFire target module 203 determines a target exhaust temperature reflecting an optimal firing temperature at which the gas turbine 100 is designed to operate. Each of these determined temperatures are supplied to maximum selector module 208, which supplies the maximum of its two inputs to minimum selector module 209. TFire limiting module 204 also determines a target exhaust temperature reflecting a maximum temperature for optimal firing of the gas turbine, which in some embodiments may be higher than the TFire target exhaust temperature, and supplies the determined temperature to minimum selector module 209. Minimum selector module 209 selects the minimum value from maximum operating temperature 205, NOx limiting module 201, maximum selector module 208, and TFire limiting module 204, and outputs the minimum value as an overall target exhaust temperature at output 210. The controller 200 then regulates the operation of combustors 106 and 107 to achieve the target exhaust temperature given at output 210 at exhaust duct 109.

An operator of gas turbine 100 may determine that conditions of high ambient temperature and humidity exist at inlet duct 102, and turn on NOx compliant peak operation if necessary to meet high power demand levels. Alternatively, NOx compliant peak may be turned on automatically if conditions are determined to be appropriate. When NOx compliant peak mode is turned on, bias module 206 for TFire target module 203 and bias module 207 for TFire limiting module 204 are enabled. Bias modules 206 and 207 raise the outputs of TFire target module 203 and TFire limiting module 204 such that the outputs of TFire target module 203 and TFire limiting module 204 are higher than the output of NOx limiting module 201, resulting in NOx limiting module 201 supplying the controlling input to minimum selector module 209. This allows the gas turbine 100 to raise power output to the limit of NOx compliance.

If conditions of relatively high ambient humidity and temperature exist, the temperature determined by NOx limiting module 201 may be higher than maximum exhaust temperature 205. Under such conditions, the maximum exhaust temperature input 205 may be the controlling input to minimum selector 209, and the gas turbine 100 will operate at the maximum exhaust temperature 205, which may result in NOx levels below the compliance limit.

Figure 3:
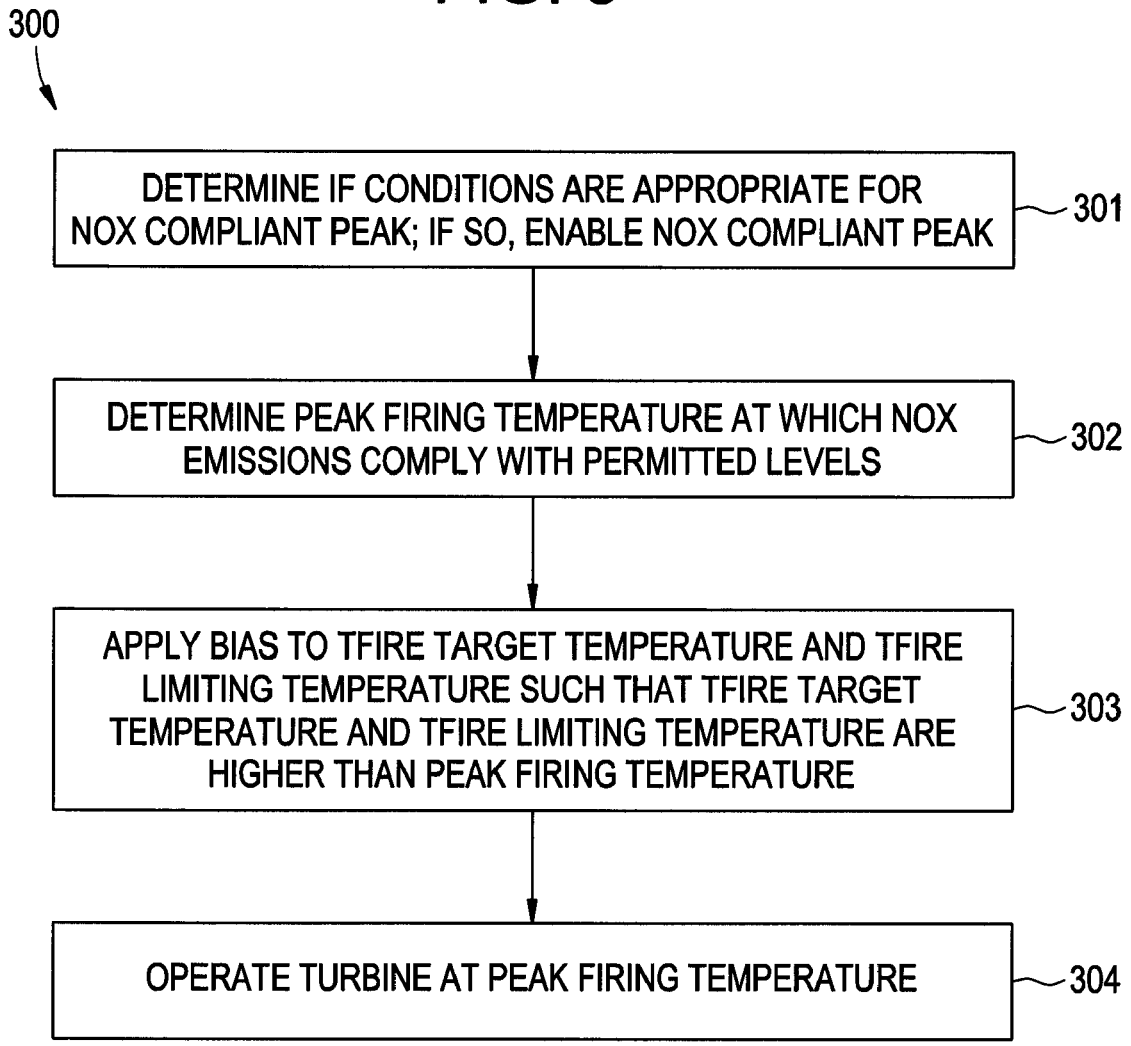
FIG. 3 is an embodiment of a method for NOx compliant peak.

FIG. 3 illustrates an embodiment of a method 300 for NOx compliant peak. In block 301, it is determined whether conditions are appropriate for NOx compliant peak operation. The conditions may include high ambient humidity, high ambient temperature, and high power demand. The determination may be made by an operator of the gas turbine, or may be made automatically. If conditions are appropriate, NOx compliant peak operation is enabled. In block 302, a peak firing temperature at which NOx emissions levels are below maximum permitted levels is determined. In block 303, a bias is applied the TFire target temperature and the TFire limiting temperature, raising the TFire target temperature and the TFire limiting temperature so that they are higher than the peak firing temperature determined in block 302. In some embodiments, the TFire target temperature and TFire limiting temperature may be pegged to a maximum rated exhaust temperature of the gas turbine. In block 304, the gas turbine operates at the peak firing temperature determined in block 302, limiting NOx emissions to permitted levels while enhancing power production.

Figure 4:
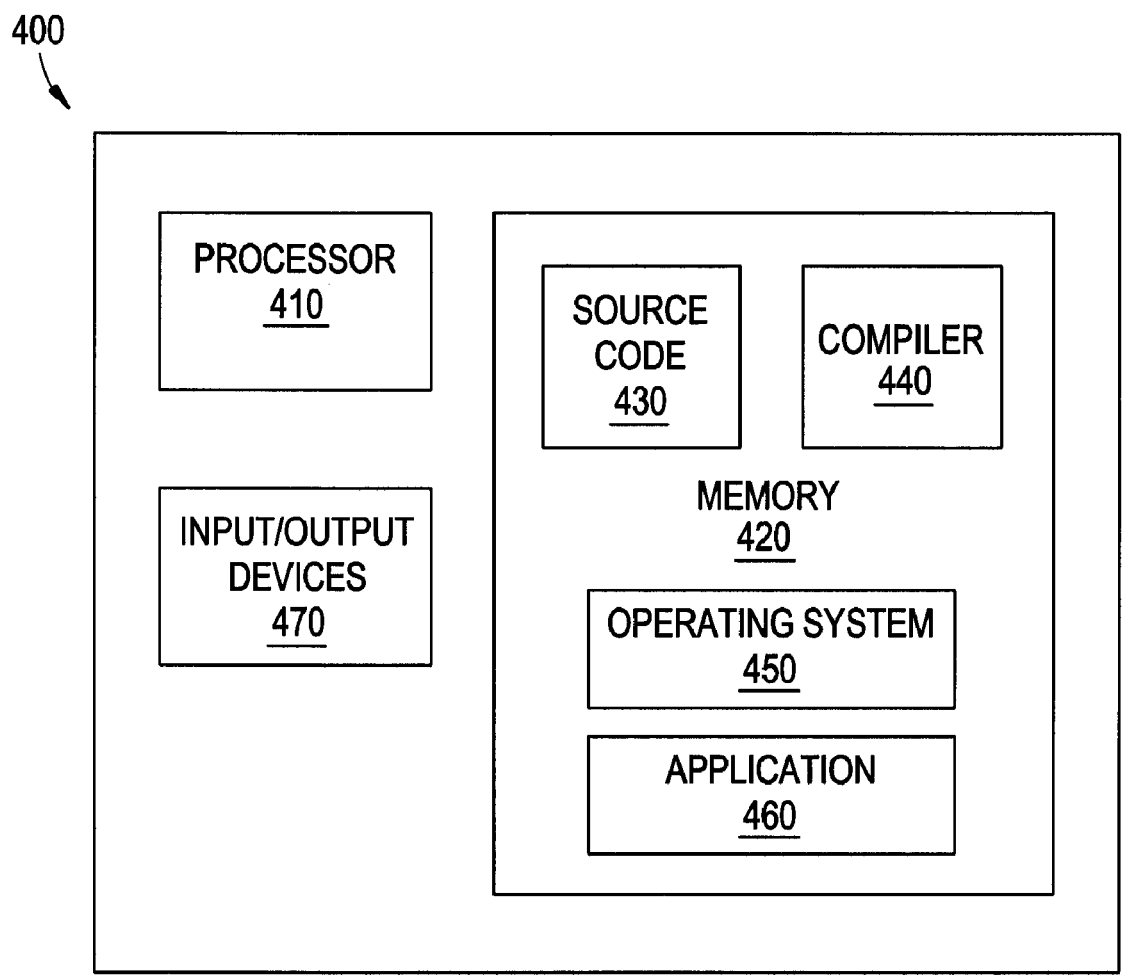
FIG. 4 is an embodiment of a computer that may be used in conjunction with embodiments of a controller for a gas turbine controller comprising NOx compliant peak.

FIG. 4 illustrates an example of a computer 400 having capabilities, which may be utilized by exemplary embodiments of a controller for a gas turbine comprising a NOx compliant peak as embodied in software. Various operations discussed above may utilize the capabilities of the computer 400. One or more of the capabilities of the computer 400 may be incorporated in any element, module, application, and/or component discussed herein.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a data signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), a USB drive, and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A gas turbine, comprising:
   a plurality of target exhaust temperature determination modules, the plurality of target exhaust temperature modules comprising a nitrogen oxide (NOx) compliance module configured to output a NOx exhaust temperature at which an exhaust of the gas turbine complies with a maximum permitted level of NOx, and wherein the plurality of target exhaust temperature determination modules further comprises a carbon monoxide (CO) limiting module configured to output a CO exhaust temperature at which an exhaust of the gas turbine complies with a maximum permitted level of CO, a TFire target module configured to output a first target temperature for operation of the gas turbine, and a TFire limiting module configured to output a second target temperature for operation of the gas turbine, wherein the second target temperature is higher than the first target temperature;
   a maximum selector module, the maximum selector module configured to receive the CO exhaust temperature from the CO limiting module and the first target temperature from the TFire target module, and to output the higher of the CO exhaust temperature and the first target exhaust temperature;
   a minimum selector module, the minimum selector module configured to receive the output of the maximum selector module, the NOx exhaust temperature from the NOx compliance module, and the second target temperature from the TFire limiting module, and to output the lowest of the output of the maximum selector module, the NOx exhaust temperature, and the second target temperature; and
   a controller configured to operate the gas turbine in a NOx compliant peak mode to produce the NOx exhaust temperature determined by the NOx compliance module in the event the NOx exhaust temperature is output by the minimum selector module.

2. The gas turbine of claim 1, further comprising at least one bias module, the at least one bias module configured to apply a bias to an output of at least one of the plurality of target exhaust temperature determination modules in the event the NOx compliant peak mode is enabled for the gas turbine.

3. The gas turbine of claim 2, wherein the at least one bias module comprises a first bias module configured to apply a bias to the first target temperature output of the TFire target module.

4. The gas turbine of claim 2, wherein the at least one bias module comprises a second bias module configured to apply bias to the second target temperature output of the TFire limiting module.

5. The gas turbine of claim 2, wherein the at least one bias module raises the output of one of the TFire target module and the TFire limiting module to a temperature that is higher than the NOx exhaust temperature determined by the NOx compliance module.

6. The gas turbine of claim 5, wherein the at least one bias module raises the output of the one of the TFire target module and the TFire limiting module to a maximum operating temperature of the gas turbine.

7. The gas turbine of claim 2, wherein the at least one bias module is enabled by an operator of the gas turbine.

8. The gas turbine of claim 2, wherein the at least one bias module is enabled automatically.

9. The gas turbine of claim 2, wherein the at least one bias module is enabled in response to high ambient temperature, high ambient humidity, or high power demand.

10. The gas turbine of claim 1, further comprising a fuel control module configured to regulate a flow of fuel to a combustor of the gas turbine such that the combustor produces exhaust at the exhaust temperature determined by the minimum selector module.

11. A method for controlling a gas turbine, the method comprising:
    determining whether conditions are appropriate for peak operation, wherein the determination of whether conditions are appropriate for peak operation comprises a determination that an ambient temperature at a inlet of the turbine is higher than an ambient temperature threshold, a determination that an ambient humidity at the inlet of the turbine is higher than ambient humidity threshold conditions, and a determination that a current power demand is higher than a threshold power demand, and in the event that conditions are determined to be appropriate for peak operation:
       determining a first peak exhaust temperature for the gas turbine at which nitrogen oxide (NOx) emissions of the gas turbine are below a maximum permitted level;
       applying a bias to a second determined exhaust temperature; and
       operating the gas turbine at the first determined peak exhaust temperature, wherein peak operation comprises operating the gas turbine at the first determined peak exhaust temperature; and
    in the event that conditions are not determined to be appropriate for peak operation, operating the gas turbine at the second determined exhaust temperature.

12. The method of claim 11, wherein the second determined exhaust temperature comprises a TFire target temperature, and applying the bias comprises raising the TFire target temperature such that it is higher than the first determined peak exhaust temperature.

13. The method of claim 12, wherein applying the bias comprises raising the TFire target temperature such that it is equal to a maximum operating exhaust temperature for the gas turbine.

14. The method of claim 11, wherein the second determined exhaust temperature comprises a TFire limiting temperature, and applying the bias comprises raising the TFire limiting temperature such that it is higher than the first determined peak exhaust temperature.

15. The method of claim 14, wherein applying the bias comprises raising the TFire target temperature such that it is equal to a maximum operating exhaust temperature for the gas turbine.

16. The method of claim 11, wherein the determination of whether conditions are appropriate for peak operation is based on ambient temperature, ambient humidity, or power demand.

17. The method of claim 11, wherein the determination of whether conditions are appropriate for peak operation is made by an operator of the gas turbine.

18. The method of claim 11, wherein the determination of whether conditions are appropriate for peak operation is made automatically.

19. The method of claim 11, wherein operating the gas turbine at the determined peak exhaust temperature comprises controlling a flow of fuel to a combustor of the gas turbine.

* * * * *